United States Patent
Yoshihara et al.

(10) Patent No.: US 11,278,811 B2
(45) Date of Patent: Mar. 22, 2022

(54) SYSTEMS AND METHODS OF RENDERING SCREEN EFFECTS FOR MOVEMENT OF OBJECTS IN A VIRTUAL AREA

(71) Applicant: Nintendo Co., Ltd., Kyoto (JP)

(72) Inventors: Kazuki Yoshihara, Kyoto (JP);
Naonori Oonishi, Kyoto (JP); Hiroaki Hiruma, Kyoto (JP); Soojin Lee, Seongnam-si (KR); Taehoon Jun, Seongnam-si (KR); Taewoo Kim, Seongnam-si (KR)

(73) Assignee: NINTENDO CO., LTD., Kyoto (JP)

( * ) Notice: Subject to any disclaimer, the term of this patent is extended or adjusted under 35 U.S.C. 154(b) by 55 days.

(21) Appl. No.: 16/899,030

(22) Filed: Jun. 11, 2020

(65) Prior Publication Data

US 2020/0391113 A1    Dec. 17, 2020

(30) Foreign Application Priority Data

Jun. 14, 2019   (JP) .............................. JP2019-110914

(51) Int. Cl.
| | |
|---|---|
| *A63F 13/573* | (2014.01) |
| *A63F 13/426* | (2014.01) |
| *G06T 15/00* | (2011.01) |
| *A63F 13/52* | (2014.01) |
| *A63F 13/428* | (2014.01) |

(52) U.S. Cl.
CPC .......... *A63F 13/573* (2014.09); *A63F 13/426* (2014.09); *A63F 13/428* (2014.09); *A63F 13/52* (2014.09); *G06T 15/005* (2013.01)

(58) Field of Classification Search
CPC ...... A63F 13/573; A63F 13/426; A63F 13/52; A63F 13/428; A63F 13/2145
See application file for complete search history.

(56) References Cited

U.S. PATENT DOCUMENTS 5,265,888 A * 11/1993 Yamamoto ............ A63F 13/005
 463/10
5,680,533 A * 10/1997 Yamato .................. A63F 13/10
 345/473

(Continued)

OTHER PUBLICATIONS

"Dr. Mario: Miracle Cure", Instruction Manual, published May 31, 2015, 34 pages, https://www.nintendo.co.jp/data/software/manual/manual_ax8a.pdf.

*Primary Examiner* — Chase E Leichliter
(74) *Attorney, Agent, or Firm* — Nixon & Vanderhye P.C.

(57) ABSTRACT

The information processing apparatus comprises: a movement possibility determination unit that determines whether there is a target position to which the operable object can move between the current position of the operable object and the designated position; an object movement unit that removes the restriction on movement of the operable object to move the operable object to the target position on the condition that the target position is determined; and a rendering information generation unit that generates rendering information having a different screen effects between that in the case where the non-operable object exists between the current position and the designated position and the case where the non-operable object does not exist between the current position and the designated position.

18 Claims, 11 Drawing Sheets

(56) References Cited

U.S. PATENT DOCUMENTS

| | | | |
|---|---|---|---|
| RE36,675 E * | 4/2000 | Yamamoto | A63F 13/95 463/10 |
| 7,722,452 B2 * | 5/2010 | Miura | A63F 13/10 463/9 |
| 10,786,730 B2 * | 9/2020 | Morishita | G06F 3/04842 |
| 11,040,283 B2 * | 6/2021 | Yamagami | A63F 13/46 |
| 2005/0233793 A1 * | 10/2005 | Yamada | A63F 13/00 463/9 |
| 2006/0073863 A1 * | 4/2006 | Hagiwara | A63F 13/2145 463/9 |
| 2007/0060235 A1 * | 3/2007 | Miura | A63F 13/2145 463/9 |
| 2007/0287517 A1 * | 12/2007 | Asuna | A63F 13/10 463/7 |
| 2011/0244937 A1 * | 10/2011 | Yamashita | A63F 13/80 463/9 |
| 2012/0322556 A1 * | 12/2012 | Rogers | A63F 13/23 463/37 |
| 2014/0235338 A1 * | 8/2014 | Hansson | A63F 13/533 463/31 |
| 2014/0370950 A1 * | 12/2014 | Hansson | A63F 13/57 463/9 |
| 2016/0055705 A1 * | 2/2016 | Elias | G07F 17/34 |
| 2016/0059131 A1 * | 3/2016 | Ye | A63F 13/537 463/31 |
| 2017/0072311 A1 * | 3/2017 | Maejima | A63F 13/92 |
| 2019/0054380 A1 * | 2/2019 | Gustafsson | A63F 13/69 |
| 2019/0099664 A1 * | 4/2019 | Morishita | A63F 13/822 |
| 2019/0299093 A1 * | 10/2019 | Kamfjord | G06F 3/04842 |
| 2019/0329133 A1 * | 10/2019 | Okamura | G06F 3/0481 |
| 2019/0366218 A1 * | 12/2019 | Aityan | A63F 13/69 |
| 2019/0388780 A1 * | 12/2019 | Gustafsson | G06F 3/0488 |
| 2020/0391113 A1 * | 12/2020 | Yoshihara | A63F 13/2145 |

* cited by examiner

SYSTEMS AND METHODS OF RENDERING SCREEN EFFECTS FOR MOVEMENT OF OBJECTS IN A VIRTUAL AREA

CROSS REFERENCE TO RELATED APPLICATION

This nonprovisional application is based on Japanese Patent Application No. 2019-110914 filed with the Japan Patent Office on Jun. 14, 2019, the entire contents of which are hereby incorporated by reference.

FIELD

The present disclosure relates to a non-transitory storage medium having stored therein information processing program, an information processing apparatus, an information processing system, and an information processing method for moving an operable object in a virtual area.

BACKGROUND AND SUMMARY

Conventionally, there has been a puzzle game apparatus for moving and fixing objects in a virtual puzzle area. In this game, when the object to be operated (hereinafter referred to as "operable object") is placed in the virtual puzzle area, a new operable object appears. As objects are sequentially fixed in this manner, when the objects are fixed in predetermined conditions, the objects so fixed are erased from the virtual puzzle area. In addition, objects that cannot be erased may be set in the virtual puzzle area.

In this game, in principle, there has been proposed a game in which an operable object cannot be moved through an object that is not an operation target (hereinafter referred to as a "non-operable object"), but it is possible to pass through a non-operable object by performing a predetermined operation on the operable object. In the games described on "Dr. MARIO Gyakuten! Special Effect Drug & Bacterial Eradication" (marketed on May 31, 2015, Instruction Manual, [online], May 31, 2015, [Search on Jun. 11, 2019], the Internet <URL: https://www.nintendo.co.jp/data/software/manual/manual_ax8a.pdf>), when an operable object is vigorously slid, the operable object is possible to pass through the non-operable object in its sliding direction.

It is an object of the present disclosure to improve the operability of passing through of an object in a conventional game as described above.

In a non-transitory storage medium according to one aspect has stored an information processing program that is executed by at least one processor of an information processing device, the information program causes the at least one processor to: move an operable object in accordance with a coordinate input from a user in a virtual area; on condition that the operable object is contacted with a non-operable object, restrict movement of the operable object in a direction toward the contacted non-operable object; on condition that the non-operable object exists between a current position of the operable object and a designated position designated by the coordinate input, determine whether there is a target position to which the operable object can move, wherein the target position is a position between the current position and the designated position, and is a position on the designated position side with reference to the position of the non-operable object; and generate rendering information for rendering the virtual area, the operable object, and the non-operable object, wherein the at least one processor, in the moving of the operable object, on condition that it is determined that there is the target position, moves the operable object to the target position regardless of the restriction, and in the generation of the rendering information, on condition that the non-operable object exists between the current position and the designated position, generates the rendering information that has a screen effect different from that when the non-operable object does not exist between the current position and the designated position.

This configuration improves the operability because the user can recognize by the screen effect that there is a possibility that the operable object may pass through the non-operable object despite the restriction of the movement by the non-operable object.

The at least one processor may determine that there is the target position on condition that there is an area which size is equal to or larger than the size of the operable object at a position that is a candidate for the target position. With this configuration, it is possible to move the operable object by passing through the non-operable object when there is enough area on the other side of the non-operable object to move the operable object.

In the movement of the object, when there are a plurality of the target positions, the at least one processor may move the operable object stepwise in order from the target position close to the current position on condition that there are a plurality of the target positions. With this configuration, the user can easily recognize at which position of the plurality of target positions the operable object can be moved.

In the movement of the object, the at least one processor may fix the operable object at the current position on condition that the operable object is restricted from moving due to contact with the non-operable object and there is not the coordinate input, and may keep the operable object at the current position without fixing the operable object at the current position on condition that the operable object is restricted from moving due to contact with the non-operable object and there is the coordinate input. With this configuration, the user can easily select a moving destination of the operable object after passing through the non-operable object.

In the generation of the rendering information, the at least one processor may generate rendering information in which the display mode of the operable object is changed from the first mode to the second mode while the operable object is kept at the current position. This configuration also improves the operability because the user can recognize, by the screen effect, the possibility that the operable object may pass through the non-operable object by releasing the restriction of the movement by the non-operable object.

In the generation of the rendering information, the at least one processor may change the operable object brighter than in the first mode as the second mode. With this configuration, the screen effect can be easily recognized.

In the generation of the rendering information, the at least one processor may cause the operable object to shake as the second mode. This configuration also improves the operability because the user can recognize, by the screen effect, the possibility that the operable object may pass through the non-operable object by releasing the restriction of the movement by the non-operable object.

In the moving of the operable object to the target position, the at least one processor, when moving the operable object to the target position, may move the operable object after a predetermined interval from a timing at which it is determined that there is the target position. With this configuration, it can be perceived that the movement restriction by the non-operable object was canceled and the passing through was performed. In addition, when it is necessary to arrange the operable object at the position where the movement is restricted, it can be realized easily.

In the generation of the rendering information, the at least one processor may generate rendering information for rendering a line connecting the current position and the designated position as the rendering information having the screen effect. This configuration also improves the operability because the user can recognize, by the screen effect, the possibility that the operable object may pass through the non-operable object by releasing the restriction of the movement by the non-operable object.

The at least one processor may automatically move the operable object in an automatic movement direction when there is no coordinate input from the user in the moving of the operable object.

In the moving of the operable object, the at least one processor, in the movement of the operable object, may fix the operable object at the current position of when the operable object contacts the non-operable object in the automatic movement direction.

In the moving of the operable object, the at least one processor may inhibit movement of the operable object in a direction opposite to the automatic movement direction.

In the moving of the operable object, the at least one processor may fix the operable object as the non-operable object in the virtual area.

In the virtual area there may be the non-operable object other than the non-operable object changed from the operable object.

The non-operable object may has a plurality of types, and the information processing program may further cause the at least one processor to, on condition that the non-operable objects of the same type are adjacent to each other by the predetermined number or more, erase the predetermined number or more of the non-operable objects of the same type from the virtual area.

An information processing apparatus of one aspect comprises: a memory storing a computer-readable program thereon; and one or more processors. The one or more processors, when executing the computer-readable program, performs: moving an operable object in accordance with a coordinate input from a user in a virtual area, and on condition that the operable object is contacted with a non-operable object, restricts movement of the operable object in a direction toward the contacted non-operable object; on condition that the non-operable object exists between a current position of the operable object and a designated position designated by the coordinate input, determining whether there is a target position to which the operable object can move, wherein the target position is a position between the current position and the designated position, and is a position on the designated position side with reference to the position of the non-operable object; and generating rendering information for rendering the virtual area, the operable object, and the non-operable object, wherein the one or more processors, on condition that it is determined that there is the target position, moves the operable object to the target position regardless of the restriction, and the one or more processors, on condition that the non-operable object exists between the current position and the designated position, generates the rendering information that has a screen effect different from that when the non-operable object does not exist between the current position and the designated position.

An information processing system of one aspect comprises: a memory storing a computer-readable program thereon; and one or more processors. The one or more processors, when executing the computer-readable program, performs: moving an operable object in accordance with a coordinate input from a user in a virtual area, and on condition that the operable object is contacted with a non-operable object, restricts movement of the operable object in a direction toward the contacted non-operable object; on condition that the non-operable object exists between a current position of the operable object and a designated position designated by the coordinate input, determining whether there is a target position to which the operable object can move, wherein the target position is a position between the current position and the designated position, and is a position on the designated position side with reference to the position of the non-operable object; and generating rendering information for rendering the virtual area, the operable object, and the non-operable object, wherein the one or more processors, on condition that it is determined that there is the target position, moves the operable object to the target position regardless of the restriction, and the one or more processors, on condition that the non-operable object exists between the current position and the designated position, generates the rendering information that has a screen effect different from that when the non-operable object does not exist between the current position and the designated position.

An information processing method of one aspect performed in a computer of an information processing apparatus comprises: moving an operable object in accordance with a coordinate input from a user in a virtual area, and on condition that the operable object is contacted with a non-operable object, restricts movement of the operable object in a direction toward the contacted non-operable object; on condition that the non-operable object exists between a current position of the operable object and a designated position designated by the coordinate input, determining whether there is a target position to which the operable object can move, wherein the target position is a position between the current position and the designated position, and is a position on the designated position side with reference to the position of the non-operable object; and generating rendering information for rendering the virtual area, the operable object, and the non-operable object, wherein the moving of the operable object, on condition that it is determined that there is the target position, moves the operable object to the target position regardless of the restriction, and the generating of the rendering information, on condition that the non-operable object exists between the current position and the designated position, generates the rendering information that has a screen effect different from that when the non-operable object does not exist between the current position and the designated position.

DETAILED DESCRIPTION OF NON-LIMITING EXAMPLE EMBODIMENTS

Hereinafter, a game system according to an embodiment of the present disclosure will be described with reference to the drawings. Note that the embodiments described below are examples of the case where the present disclosure is implemented, and the present disclosure is not limited to the specific configurations described below. In the implementation of the present disclosure, a specific configuration according to the embodiment may be appropriately employed.

Figure 1:
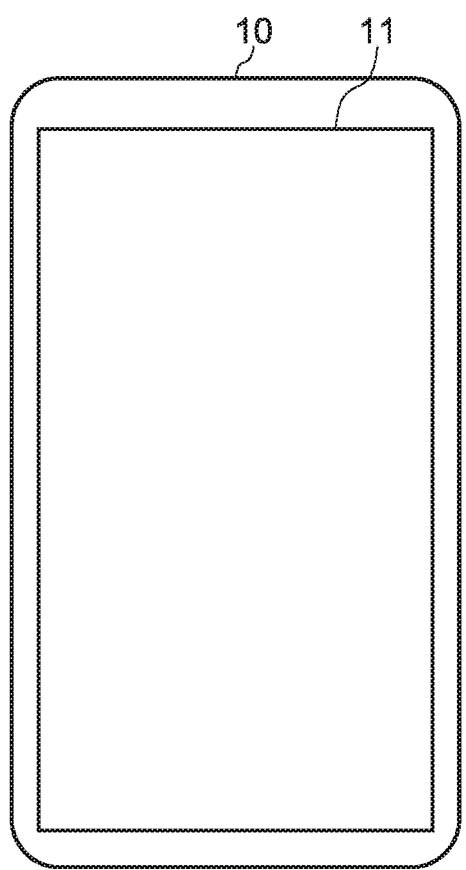
FIG. 1 is an external view showing an information processing device of a non-limiting example embodiment.

FIG. 1 is an external view showing an information processing device of a non-limiting example embodiment. The information processing apparatus 10 is a smart phone provided with a touch panel 11. Although only the front surface is shown in FIG. 1, various operation buttons may be provided on the side surface. An operation button may also be provided on the front surface. The touch panel 11 detects a touch in a capacitive manner capable of recognizing a multi-touch.

Figure 2:
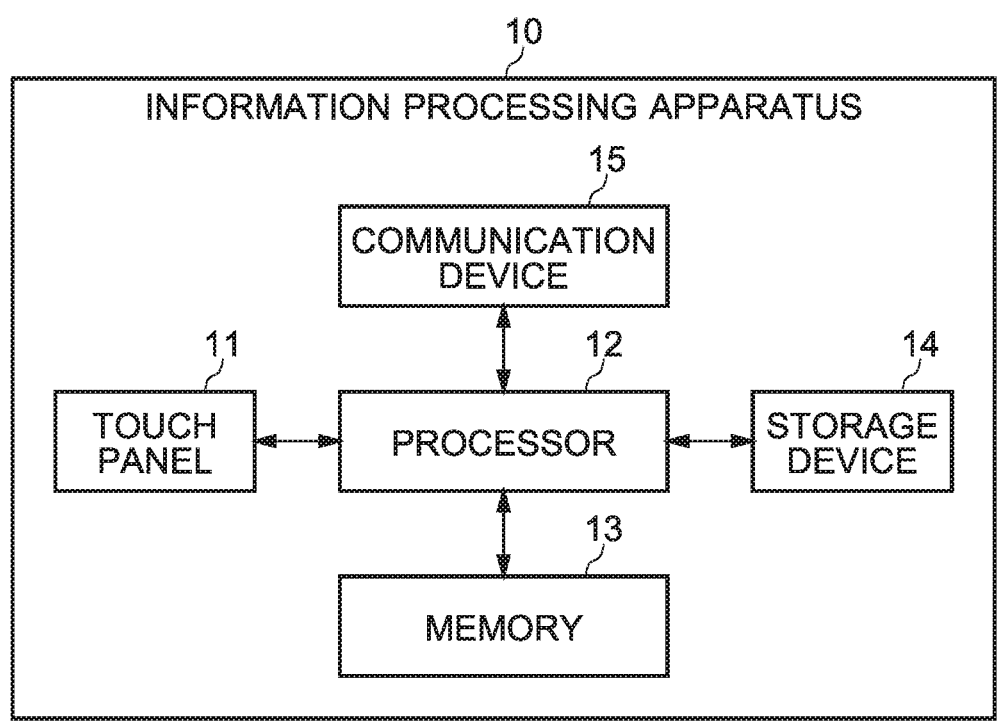
FIG. 2 is a diagram showing a configuration of an information processing device of a non-limiting example embodiment.

FIG. 2 is a diagram showing a configuration of an information processing device of a non-limiting example embodiment. FIG. 2 shows elements necessary for the description of the present embodiment. The information processing apparatus 10 includes a touch panel 11, a processor 12, a memory 13, a storage device 14, and a communication device 15. The information processing apparatus 10 realizes various functions by executing an information processing program loaded in the memory 13 with the processor 12. In the present embodiment, in particular, a game program is executed as the information processing program. The game program may be downloaded from the communication network using the communication device 15 and stored in the storage device 14 as a non-transitory storage medium, or the game program may be provided to the information processing apparatus 10 via non-transitory storage medium. The processor 12 and the memory 13 may be provided separately for general information processing and for specialized graphic processing.

Figure 3:
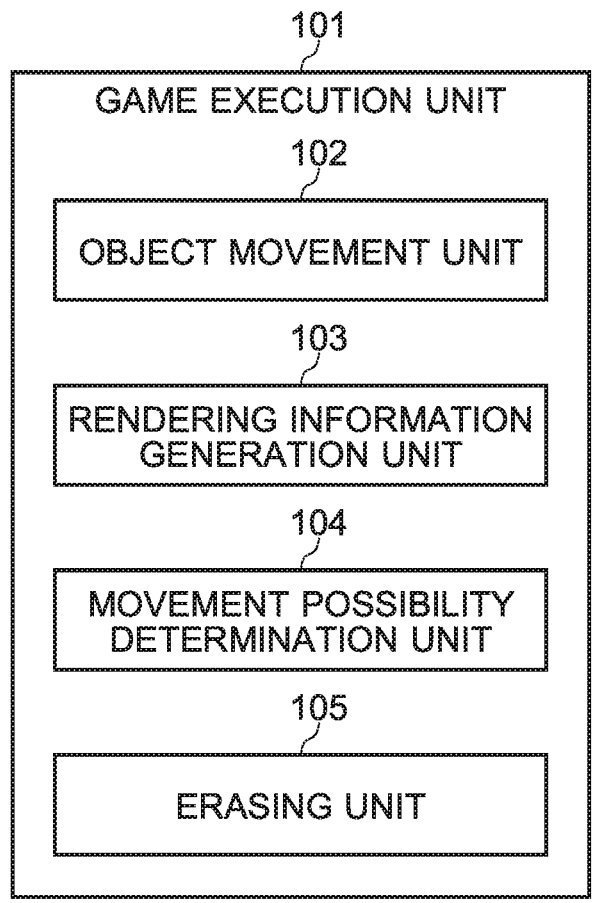
FIG. 3 is a block diagram showing functions configured by executing a game program in an information processing device of a non-limiting example embodiment.

FIG. 3 is a block diagram showing functions configured by executing a game program in an information processing device of a non-limiting example embodiment. The information processing apparatus 10 functions as a game execution unit 101 by executing the game program. FIG. 3 shows only the functions related to the present embodiment among the functions of the game execution unit 101. The game execution unit 101 includes an object movement unit 102, a rendering information generation unit 103, a movement possibility determination unit 104, and an erasing unit 105.

First, an outline of a game executed by the game execution unit 101 will be described. Note that the specification or rule of the game described below is merely an example, and the present disclosure is not limited to the specification or rule of the game described below.

Figure 4:
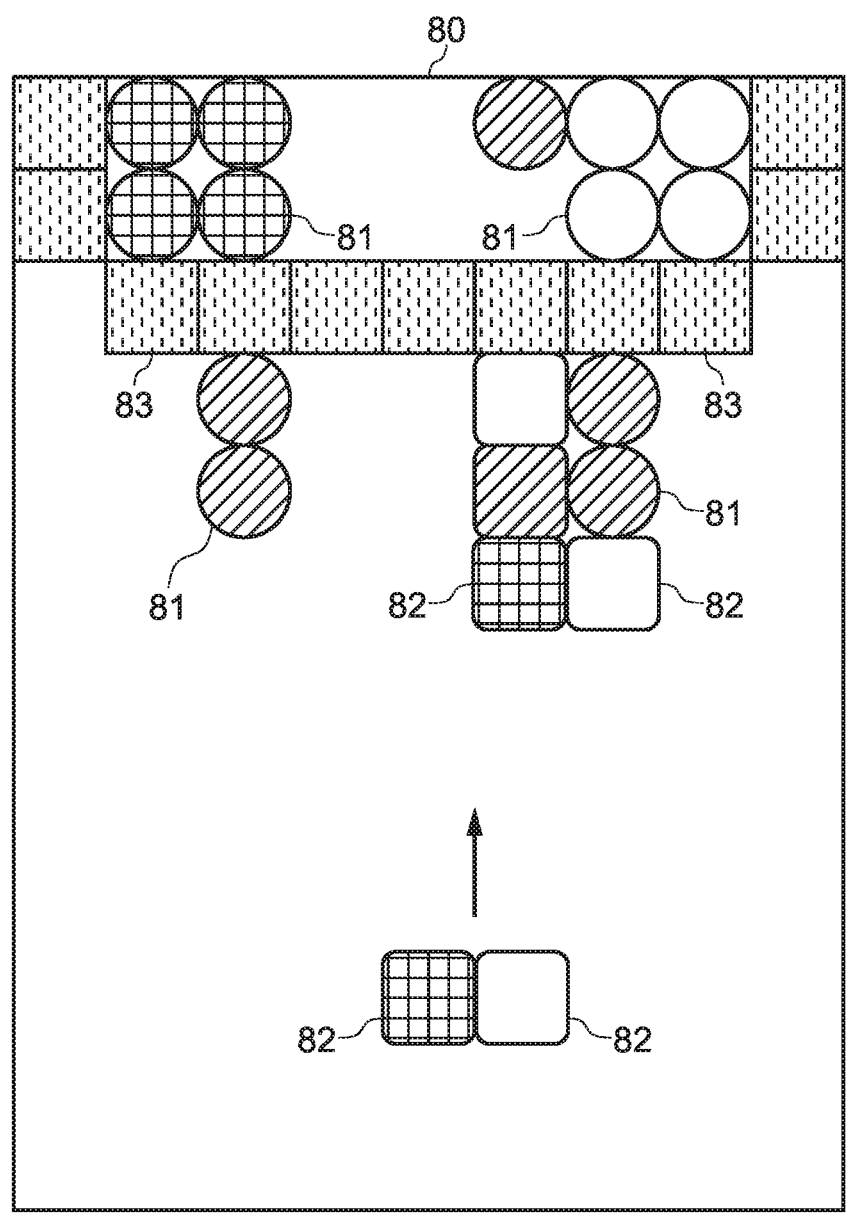
FIG. 4 is a diagram showing examples of a screen of a game of a non-limiting example embodiment.

FIG. 4 is a diagram showing examples of a screen of a game of a non-limiting example embodiment. In the virtual puzzle area 80, which is a virtual area, there is an erasure target object 81, a thrown-in object 82, and an obstacle object 83. In the present embodiment, the erasure target object 81 has a round shape, the thrown-in object 82 has a square shape with rounded corners, and the obstacle object 83 has a square shape without rounded corners. In FIG. 4, for the sake of clarity, only a part of the objects are denoted by a lead line.

The erased object 81 and the thrown-in object 82 are provided with any of three colors. In FIG. 4, the difference in color is represented by different hatchings. The game starts in a state in which the erasure target object 81 and the obstacle object 83 are arranged at upper side of the virtual puzzle area 80 in advance. The thrown-in object 82 is thrown into the virtual puzzle area 80 from below the virtual puzzle area 80, and automatically advances upward.

The user performs an operation of moving, rotating, or the like on the thrown-in object 82 which is thrown into the virtual puzzle area 80 and advances upward. Specifically, the thrown-in object 82 thrown from below is rotated by tapping, and is moved upward, rightward, and leftward by touching and dragging the thrown-in object 82. It should be noted that the thrown-in object 82 cannot be moved backward in a downward direction which is opposite to its automatic advancing direction (i.e., upward direction).

When the thrown-in object 82 comes into contact with the erasure target object 81, the thrown-in object 82 that has been previously thrown in and fixed, or the obstacle object 83, it cannot move in a contact direction and cannot move upward, and if there is no touch on the thrown-in object 82 in that state, the thrown-in object 82 is fixed at that position. When the thrown-in object 82 is fixed in this manner, a next new thrown-in object 82 is thrown-in from below the virtual puzzle area 80. Hereinafter, a thrown object 82 in a state in which a user can perform an operation such as movement or rotation is thrown into the virtual puzzle area 80 is referred to as an "operable object 91," and other objects, i.e., an erasure target object 81, an obstacle object 83, and a thrown-in object 82 that has already been fixed and cannot be moved or rotated any more, are referred to as a "non-operable object 92."

Figure 5:
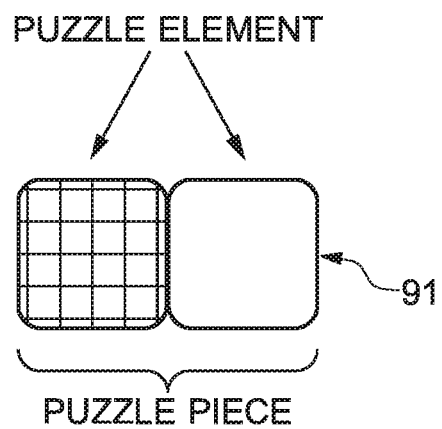
FIG. 5 is a diagram illustrating an exemplary operable object of a non-limiting example embodiment.

FIG. 5 is a diagram illustrating an exemplary operable object of a non-limiting example embodiment. The operable object 91 is a puzzle piece object (hereinafter, simply referred to as a "puzzle piece") in which two puzzle element objects (hereinafter, simply referred to as "puzzle elements") are connected. In the game according to the present embodiment, the erasure target object 81 and the thrown-in object 82 which has already been fixed and cannot be moved or rotated any more become puzzle elements. In the present embodiment, there are a plurality of types of puzzle elements having different colors.

When three or more puzzle elements of the same color are fixed adjacent to each other vertically or horizontally by operating the operable object 91 as described above, those puzzle elements are erased from the virtual puzzle area 80. In this manner, when the puzzle elements are erased and all of the erasure target objects 81 that were initially arranged are erased, the game ends as successful. On the other hand, when the thrown-in objects 82 are stacked without being erased and reach the lower end of the virtual panel area 80, the game ends as a failure.

Figure 6:
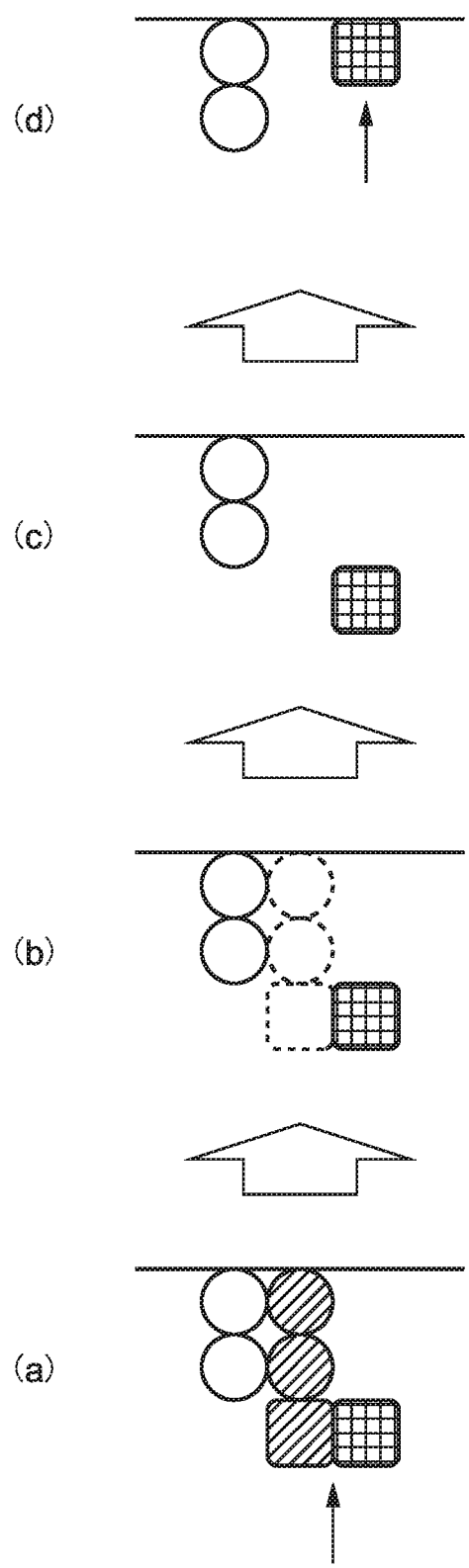
FIG. 6 is a diagram showing examples of erasing puzzle elements of a non-limiting example embodiment.

For example, when the operable object 91 is guided on the stacked puzzle elements as shown in (a) of FIG. 6, three puzzle elements of the same color are arranged vertically, and these puzzle elements are erased as shown in (b) of FIG. 6. Further, as a result, when there is a puzzle element connected to the erased puzzle element that has floated in the air as shown in (c) of FIG. 6, the puzzle element that has floated in the air is raised as shown in (d) of FIG. 6.

As described above, when the operable object 91 comes into contact with the non-operable object 92, movement of the operable object 91 is restricted by the non-operable object 92 and the movement in a contact direction becomes impossible. However, even in this case, in the game according to the present embodiment, the operable object 91 can be moved through the non-operable object 92 by sliding the touch position from the operable object 91 which cannot be moved and moving the touch position to a position exceeding the non-operable object 92 which prevents the movement of the operable object 91.

FIGS. 7 to 10 are diagrams for illustrating examples of a pass-through of an operable object of non-limiting example embodiments. The configuration of the game execution unit 101 shown in FIG. 3 will be described with reference to FIGS. 7 to 10. First, the rendering information generation unit 103 generates a screen for rendering a virtual puzzle area 80, and an operable object 91 and a non-operable object 92 in the virtual puzzle area 80. In the virtual puzzle area 80, the object moving unit 102 moves the operable object 91 in accordance with a coordinate input from a user. When there is no coordinate input from the user, the object moving unit 102 automatically moves the operable object 91 upward at a predetermined speed.

When the operable object 91 is touched and slid, the object moving unit 102 moves the operable object 91 so as to follow the slid touch position. As a result, the user can move the operable object 91 to the right and left, and can move the operable object 91 upward at a higher speed than the automatic movement. When the touch position slid from the operable object 91 is lower than the current position of the operable object 91, that is, in the opposite direction of the direction of automatic movement, the object moving unit 102 stops the operable object 91 at that position. Alternatively, in this case, the operable object 91 may be moved upward at the speed of automatic movement while ignoring such a slide operation in the reverse direction.

Figure 7:
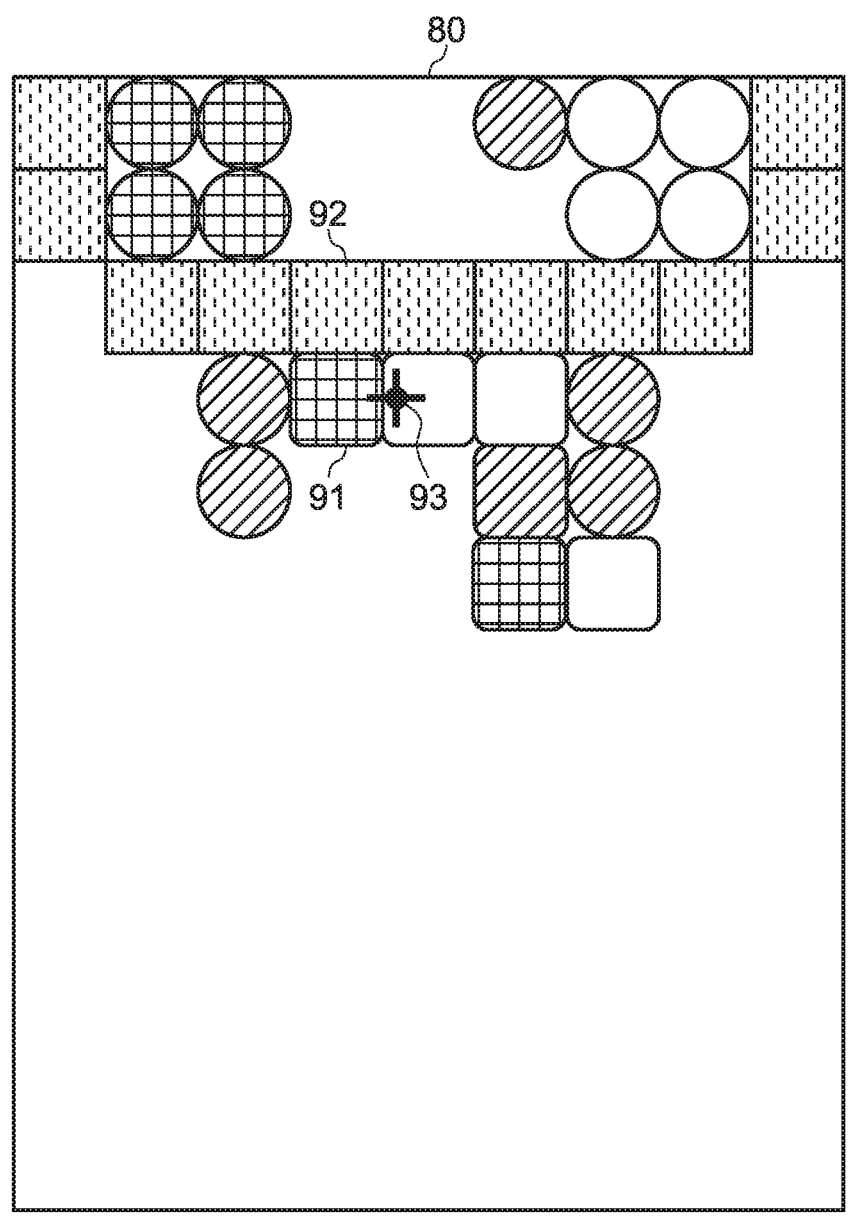
FIG. 7 is a diagram illustrating an example of a pass-through of an operable object of a non-limiting example embodiment.

As shown in FIG. 7, when the operable object 91 comes into contact with the non-operable object 92 in the movement direction, the object moving unit 102 restricts the movement of the operable object 91 in the contact direction by the non-operable object 92. In the automatic movement, when the operable object 91 becomes such a state (hereinafter referred to as "movement-restricted state") and a state in which there is no touch operation on the operable object 91 or a state in which there is no sliding touch operation from the touch operation on the operable object 91 continues for a predetermined time (for example, 0.2 seconds), the object moving unit 102 arranges the operable object 91 at the position (fixes the position) and sets the operable object 91 as the non-operable object 92.

Figure 8:
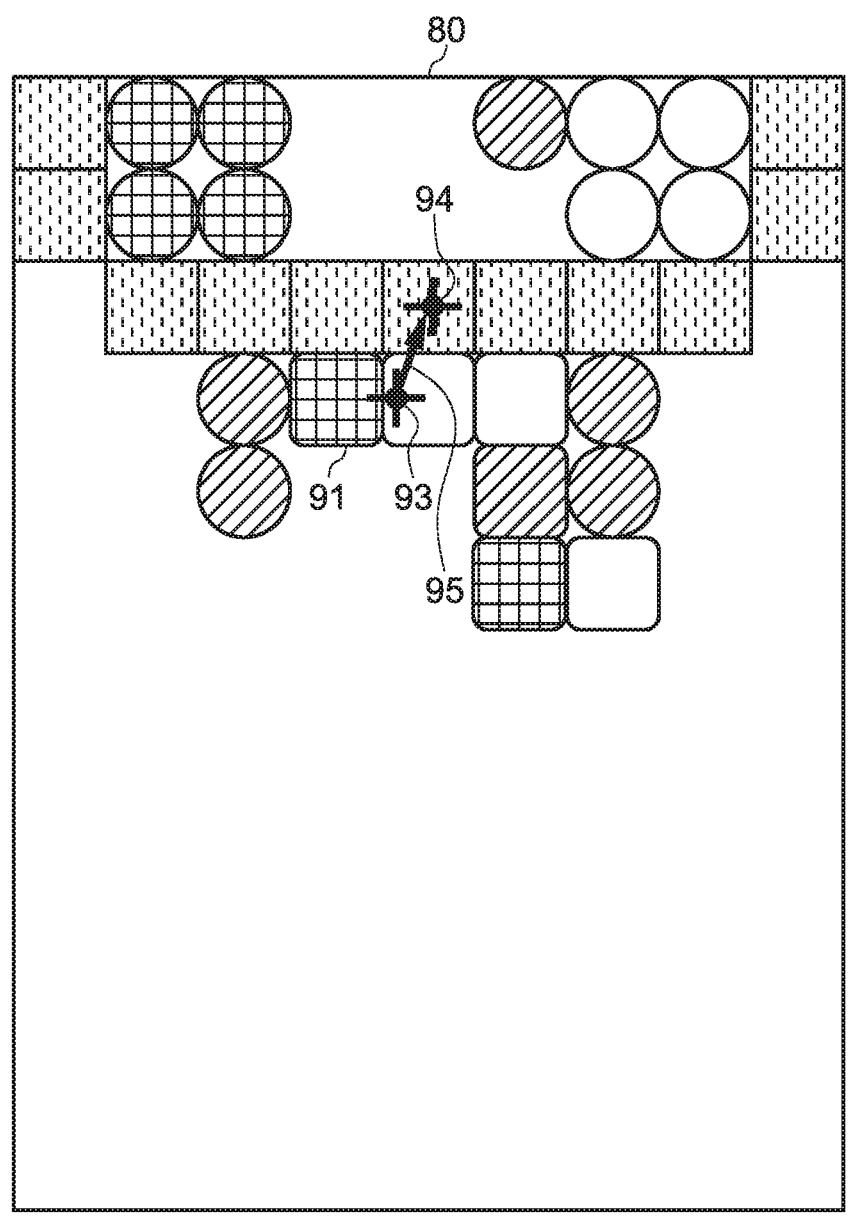
FIG. 8 is a diagram illustrating an example of a pass-through of an operable object of a non-limiting example embodiment.

In the case where the operable object 91 is in the movement-restricted state, but the operable object 91 is touched as shown in FIG. 7, or in the case where the touch position is slid after the operable object 91 is touched and the touch is maintained as shown in FIG. 8, the object moving unit 102 causes the operable object to remain at the position, but the operable object is not yet fixed at the position. In this manner, when the operable object 91 is maintained in the movement-restricted state, the rendering information generation unit 103 causes the edge portion of the operable object 91 to light brightly.

In a state in which the operable object 91 is in the movement-restricted state and the touch is continued as described above, as shown in FIG. 8, the rendering information generation unit 103 generates rendering information for rendering a line 95 connecting the current position of the operable object 91 (i.e., the touch position when the operable object 91 became the movement-restricted state) 93 and the designated position (i.e., the current touch position) 94 specified by the coordinate input and for brightening the edge portion of the operable object 91. The rendering information generation unit 103 continues this processing as long as the touch continues.

In this manner, when the non-operable object 92 exists between the current position 93 and the designated position 94, by drawing a line 95 which is not drawn when the non-operable object 92 does not exist between the current position 93 and the designated position 94 and causing a part of the operable object 91 to light brightly, the user can recognize that the arrangement of the operable object 91 has not been completed yet, the restriction on the movement by the non-operable object 92 is released, and the operable object 91 can be moved through the operable object 92.

As shown in FIG. 8, the line 95 is not limited to a line connecting the current position 93 of the operable object 91 when the movement is restricted and the designated position 94 instructed by the coordinate input. For example, the proximal end of the line 95 may not be strictly the current position 93 or the operable object 91 and the pointing position 94, and may be a line which let the user recognize that the current position 93 or the operable object 91 and the pointing position 94 are associated with each other.

When the operable object 91 is in the movement-restricted state, the movement possibility determination unit 104 determines whether or not there is a target position 96 to which the operable object can move, wherein the target position 96 is a position between the current position 93 of the operable object 91 and the designated position 94 designated by the coordinate input, and is a position on the side of the designated position 94 with reference to the position of the non-operable object 92.

Figure 9:
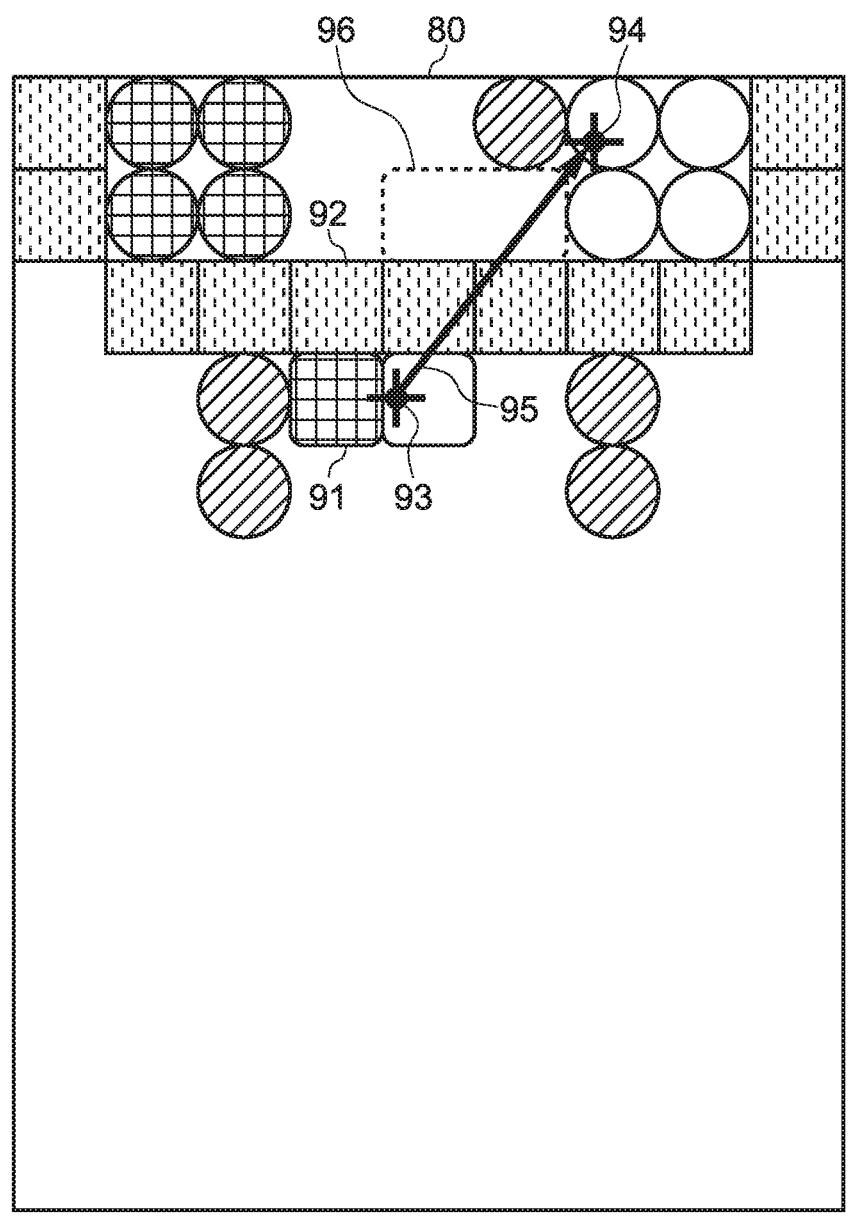
FIG. 9 is a diagram illustrating an example of a pass-through of an operable object of a non-limiting example embodiment.

As shown in FIG. 9, when the touch position is slid from the current position 93 of the operable object 91 to the designated position 94, a line 95 connecting the current position 93 and the designated position 94 is drawn. In the example of FIG. 9, the movement possibility determination unit 104 determines that there is a target position 96 on the line 95 to which the operable object 91 can move. In FIG. 9, the target position 96 is shown by a broken line, but the target position 96 is not shown in the actual virtual puzzle area 80.

When the state continues for a predetermined time (for example, 0.2 seconds) or longer from the timing at which the target position 96 is determined by the movement possibility determination unit 104 as in the state of FIG. 9, the object moving unit 102 releases the restriction on the movement of the operable object 91 by the non-operable object 92 contacting the operable object 91 in the upward direction, and moves the operable object 91 to the target position 96. Then, after the operable object 91 has moved to the target position 96, the operable object 91 becomes the movement restricted state again (which may become a movement restricted state at the target position 96), and when a predetermined time (for example, 0.2 seconds) elapses in a state in which the touch is not performed, the operable object 91 is disposed at that position.

Further, not only when the non-operable object 92 is in the upper side of the operable object 91, but also when the non-operable object 92 is in the left or right side of the operable object 91 and the movement of the operable object 91 is restricted in the left and right direction, similarly to the above, the existence of the target position 96 is determined, and the object movement unit 102 releases the movement restriction of the operable object 91 by the non-operable object 92 and moves the operable object 91 to the target position 96.

When the operable object 91 is moved to the target position 96 and a coordinate input for moving the operable object 91 in the movable direction is input before a predetermined time elapses (including a case where the coordinate input continues from before the movement to the target position 96), the object moving unit 102 moves the operable object 91 in accordance with the coordinate input.

Further, even if there is a space in which the non-operable object 92 is not arranged between the current position 93 and the designated position 94, if the space is not an area equal to or larger than the size of the operable object 91 as a candidate of the target position 96, the movable determination unit 104 does not determine such a space as a target position, and determines that there is a target position when there is an area having a sufficient size to move the operable object 91.

Figure 10:
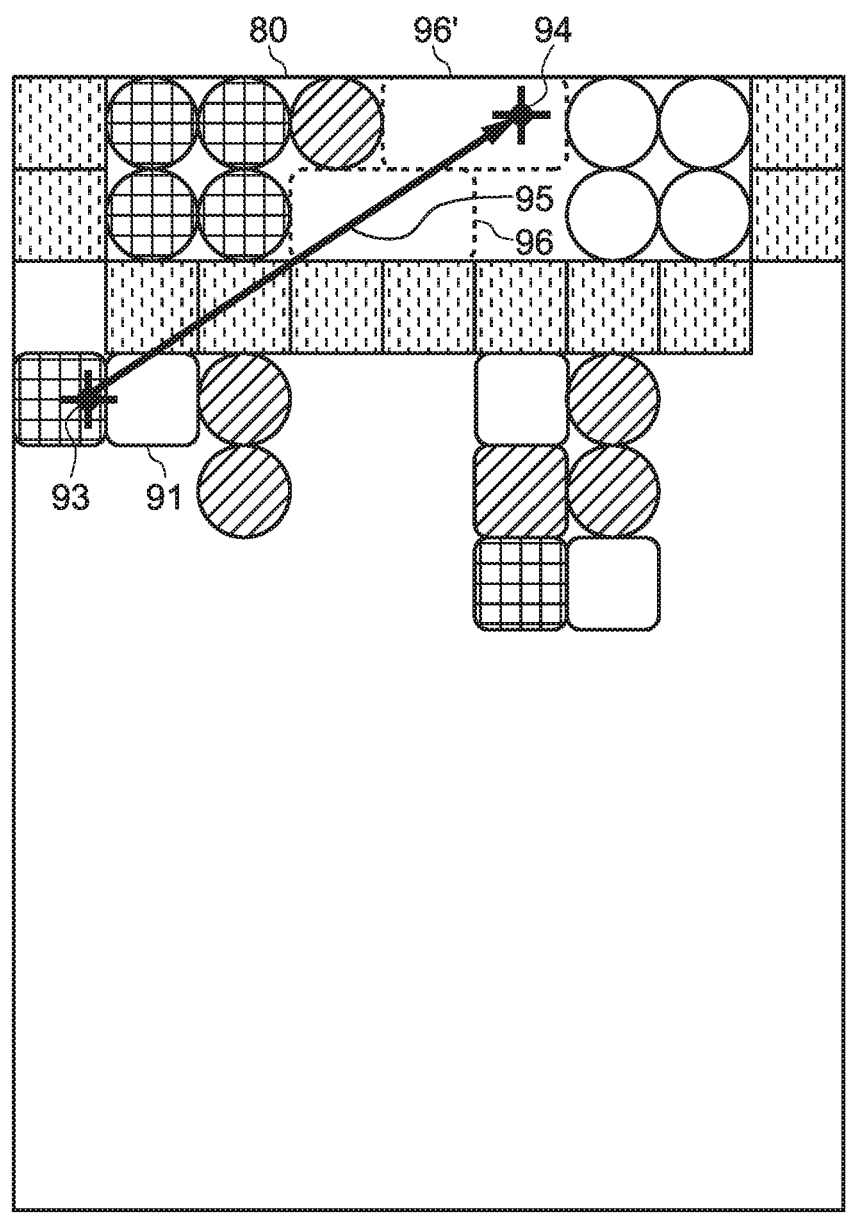
FIG. 10 is a diagram illustrating an example of a pass-through of an operable object of a non-limiting example embodiment.

As shown in FIG. 10, when there are a plurality of target positions 96 and 96' to which the operable object 91 can move between the current position 93 and the designated position 94 of the operable object 91, the object moving unit 102 first moves the operable object 91 stepwise in the order of the target position 96 that is closer to the current position 93 and the target position 96' that is farther away. Also in this case, the object moving unit 102 first moves the operable object 91 to the target position 96 closer to the current position 93, and moves the operable object 91 to the further target position 96' after a predetermined time (e.g., 0.2 seconds) has elapsed.

Instead of this, when there are a plurality of target positions 96 and 96', the object moving unit 102 may move the operable object 91 directly to the farther target position 96' without moving it to the nearer target position 96. The object moving unit 102 may move the operable object 91 stepwise in the same manner as described above even when the non-operable object 92 further exists between the closer target position 96 and the farther target position 96'.

When the operable object 91 is moved and arranged as described above, the erasing unit 105 determines whether or not three or more puzzle elements of the same color are arranged adjacent to each other in the vertical direction or the horizontal direction, and when there are three or more puzzle elements of the same color arranged adjacent to each other in the vertical direction or the horizontal direction, the erasing unit 105 erases the puzzle elements from the virtual puzzle area 80. The arrangement of the puzzle elements after erasing is as described with reference to FIG. 6.

Figure 11:
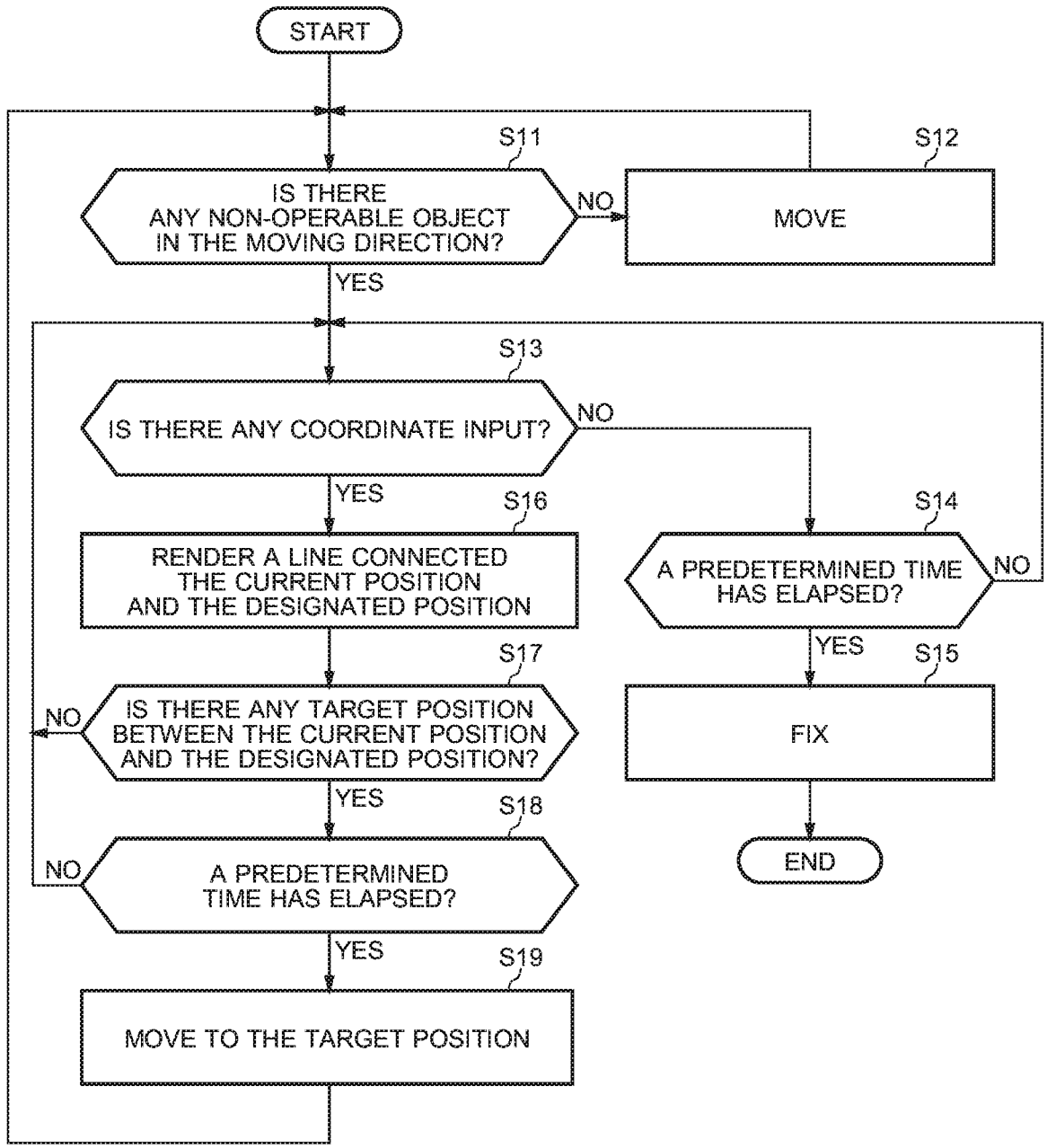
FIG. 11 is a flowchart of information processing of a non-limiting example embodiment.

FIG. 11 is a flowchart of information processing of a non-limiting example embodiment. In step S11, the object moving unit 102 determines whether or not there is a non-operable object 92 that restricts the movement of the operable object 91 in the moving direction of the operable object 91. When there is no non-operable object 92 in the moving direction (NO in step S11), the operable object 91 is moved in the moving direction (step S12). In this movement (step S12), the object moving unit 102 moves the operable object 91 in accordance with the instruction when there is an instruction by the coordinate input, and automatically moves the operable object 91 in the upward direction at a predetermined speed when there is no instruction by the coordinate input.

In step S13, when there is a non-operable object 92 in the moving direction and the movement of the operable object 91 is restricted (YES in step S11), the object movement unit 102 determines whether or not there is a coordinate input with respect to the operable object 91. When there is no coordinate input (NO in step S13), it is determined whether or not a predetermined time has elapsed (step S14). If the predetermined time has not elapsed (NO in step S14), the determination of whether or not there is a coordinate input (step S13) is repeated, and if the predetermined time has elapsed without the coordinate input (YES in step S14), the operable object 91 is fixed at the position (step S15), and the movement and arrangement processing of the operable object 91 is terminated.

When the movement is restricted by the non-operable object 92 (YES in step S11) and there is a coordinate input with respect to the operable object 91 (YES in step S13), the rendering information generation unit 103 generates rendering information for rendering a line 95 connecting the current position 93 of the operable object 91 and the designated position 94 of the coordinate input (step S16), and the movement possibility determination unit 104 determines whether or not there is a target position 96 to which the operable object 91 can move, on the side of the designated position 94 with reference to the position of the non-operable object 92, which is a position between the current position 93 of the operable object 91 and the designated position 94 instructed by the coordinate input (step S17).

If there is no target position 96 (NO in step S17), it is determined whether or not the coordinate input is maintained (step S13). As described above, even when the target position 96 is not present, the line 95 continues to be drawn in accordance with the designated position 94 by repeating steps S13, S16, and S17 as long as there is a coordinate input, and the operable object 91 is maintained in an operable state without being fixed. When it is determined that there is the target position 96 (YES in step S17) and the predetermined time has elapsed (YES in step S18), the operable object 91 is moved to the target position 96 (step S19).

If the target position 96 is present (YES in step S17) but the predetermined time has not elapsed (NO in step S18), it is checked whether the coordinate input has been stopped (step S13), and steps S13, S16, S17, and S18 are repeated.

On the other hand, after the operable object 91 is moved to the target position 96 in step S19, the process returns to step S11 to repeat the same process as described above. As a result, when there are a plurality of target positions 96 between the current position and the designated position before step S19, and the coordinate input is maintained even after the operable object 91 has moved to the target position 96, the process proceeds to steps S11, S13, S16, S17, and S18, and the operable object 91 moves to the next target position 96 after a predetermined time has elapsed (step S19). In this manner, when there are a plurality of target positions 96, the operable object 91 moves sequentially to the plurality of target positions 96.

As described above, according to the information processing apparatus 1 of the present embodiment, if the coordinate input is maintained when the operable object 91 contacts the non-operable object 92 and thereby the movement is restricted by the non-operable object 92, the rendering information generation unit 103 renders the line 95 which is not drawn when the non-operable object 92 does not exist between the current position 93 and the designated position 94 when the non-operable object 92 exists between the current position 93 and the designated position 94, and brightens the edge portion of the operable object 91, thereby generating rendering information indicating that the arrangement of the operable object 91 has not yet been performed, and there is a possibility that the restriction on the movement by the non-operable object 92 is released, and the operable object 91 may be moved through the non-operable object 92. This makes it easier for the user to recognize that the operation to move the operable object 91 through the non-operable object 92 is possible. Further, as compared with a mode in which the pass-through is enabled by sliding the operable object 91 vigorously as in the conventional system, there is an advantage in that it is easy to adjust where the operable object is fixed after the pass-through.

In the above embodiment, the line 95 connecting the current position 93 of the operable object 91 and the designated position 94 of the coordinate input is drawn, and a part of the operable object 91 in the movement-restricted state is brightly illuminated, so that the arrangement of the operable object 91 is not yet performed, and the restriction of the movement by the non-operable object 92 may be released and the operable object 91 may be moved through the non-operable object 92, but such a screen effect is not limited to the above example.

For example, in the above embodiment, the operable object 91 in the movement-restricted state is brightly illuminated, but in addition to or instead of this, a part of the non-operable object 92 that restricts the movement of the operable object 91 may be brightly illuminated. Alternatively, the contact surface between the operable object 91 in the movement-restricted state and the non-operable object 92 that restricts the movement of the operable object 91, or a part thereof, may be brightly illuminated.

For example, the rendering information generation unit 104 may display an ellipse surrounding the current position 93 of the operable object 91 and the designated position 94 of the coordinate input. Further, for example, the rendering information generation unit 104 may generate rendering information that vibrates the operable object 91 in the movement-restricted state and/or the non-operable object 92 that restricts the movement of the operable object 91 in the movement-restricted state, in addition to or instead of causing a part of the operable object 91 in the movement-restricted state to light brightly.

Alternatively, when the movement possibility determination unit 104 determines that there is a target position 96, the rendering information generation unit 103 may generate rendering information for displaying or blinking the target position 96 with a broken line frame or a silhouette. With any of these methods, it is possible for the user to recognize that the operable object 91 has not been fixed yet and that the movement restriction by the non-operable object 92 may be canceled and that the operable object 91 may be moved past the non-operable object 92.

In the above embodiment, the rendering information generation unit 103 generates rendering information for rendering the line 95 regardless of whether or not the target position 96 is present when the operable object 91 is in the movement-restricted state, and indicates that there is a possibility of a pass-through movement, but instead, the rendering information generation unit 103 may generate rendering information having a screen effect indicating that the target position 96 is present only when the target position 96 is present.

Alternatively, the rendering information generation unit 103 may generate rendering information having a first screen effect regardless of the presence or absence of the target position 96 when the operable object 91 is in the movement-restricted state, and may generate rendering information having a second screen effect different from the first screen effect in addition to or instead of the first screen effect when the target position 96 is present.

In addition, in the above embodiment, in the case of performing a movement operation on the operable object 91, the operable object 91 is touched and slid at the touch position without release the touch, so that the operable object 91 follows the touch position. However, the method of moving the operable object 91 is not limited to this. For example, the movement operation of the operable object 91 may be performed by touching a position in the traveling direction of the operable object 91, which is above the operable object 91 in the case of the above embodiment, so that the operable object 91 moves toward the touch position.

In this case as well, when there is a non-operable object 92 between the current position 93 of the operable object 91 and the designated position 94 by the coordinate input (touch), the rendering information generation unit 103 may generate the rendering information having a different screen effect from the case where there is no such non-operable object 92. In other words, when there is a non-operable object 92 between the current position 93 of the operable object 91 and the designated position 94 by the coordinate input (touch), the rendering information generation unit 103 generates rendering information having a screen effect different from that in the case where there is no such non-operable object 92, as in the above embodiment, is not limited to the case where the operable object 91 is in the movement-restricted state.

In the above embodiment, an example in which the information processing apparatus 1 is configured as a single apparatus such as a smart phone has been described, but the configuration shown in FIG. 3 may be distributed to a plurality of apparatuses, and further, by connecting the plurality of apparatuses via a communication network, an information processing system may be configured, and functions similar to those of the information processing apparatus 1 may be realized in such an information processing system.

Further, in the above embodiment, an example in which the information processing apparatus 1 is configured by a general-purpose information processing apparatus such as a smart phone has been described, but the information processing apparatus 1 may be configured by a specialized game apparatus for executing a corresponding game by installing various game programs, or may be configured by a puzzle game apparatus exclusively for executing the game program of the present embodiment.

We claim:

1. A non-transitory storage medium having stored an information processing program that is executed by at least one processor of an information processing device, the information program configures the at least one processor to:
   move an operable object in a virtual area in accordance with a coordinate input from a user, and on condition that the operable object contacts a non-operable object, restrict movement of the operable object in a direction toward the non-operable object contacted by the operable object;

determine whether or not there is a target position to which the operable object can move, on condition that there is the non-operable object between a current position of the operable object and a designated position designated by the coordinate input, wherein the target position is a position between the current position and the designated position, and is a position on a side, with reference to the position of the non-operable object, of the designated position; and generate rendering information for rendering the virtual area, the operable object, and the non-operable object, on condition that it is determined that there is the target position, move the operable object to the target position regardless of the restriction, and on condition that the non-operable object exists between the current position and the designated position, generate the rendering information that has a screen effect different from that when the non-operable object does not exist between the current position and the designated position.

2. The non-transitory storage medium according to claim 1, wherein the information program further configures the at least one processor to determine that there is the target position on condition that there is an area which size is equal to or larger than the size of the operable object at a position that is a candidate for the target position.

3. The non-transitory storage medium according to claim 1, wherein the information program further configures the at least one processor to, in the moving of the operable object, move the operable object stepwise in order from the target position close to the current position on condition that there are a plurality of the target positions.

4. The non-transitory storage medium according to claim 1, wherein the information program further configures the at least one processor to, in the moving of the operable object, fix the operable object at the current position on condition that the operable object is restricted from moving due to contact with the non-operable object and there is not the coordinate input, and keeps the operable object at the current position without fixing the operable object at the current position on condition that the operable object is restricted from moving due to contact with the non-operable object and there is the coordinate input.

5. The non-transitory storage medium according to claim 4, wherein the information program further configures the at least one processor to generate rendering information in which a display mode of the operable object is changed from a first mode to a second mode while the operable object is kept at the current position.

6. The non-transitory storage medium according to claim 5, wherein the information program further configures the at least one processor to change the operable object brighter than in the first mode as the second mode.

7. The non-transitory storage medium according to claim 5, wherein the information program further configures the at least one processor to cause the operated object to shake as the second mode.

8. The non-transitory storage medium according to claim 1, wherein the information program further configures the at least one processor to, in the moving of the operable object to the target position, moves the operable object after a predetermined interval from a timing at which it is determined that there is the target position.

9. The non-transitory storage medium according to claim 1, wherein the information program further configures the at least one processor to generate rendering information for rendering a line connecting the current position and the designated position as the rendering information having the screen effect.

10. The non-transitory storage medium according to claim 1, wherein the information program further configures the at least one processor to automatically move the operable object in an automatic moving direction on condition that the user does not input the coordinate.

11. The non-transitory storage medium according to claim 10, wherein the information program further configures the at least one processor to fix the operable object at the current position of when the operable object contacts the non-operable object in the automatic movement direction.

12. The non-transitory storage medium according to claim 10, wherein the information program further configures the at least one processor to inhibit movement of the operable object in a direction opposed to the automated movement direction.

13. The non-transitory storage medium according to claim 1, wherein the information program further configures the at least one processor to fix the operable object as the non-operable object in the virtual area.

14. The non-transitory storage medium according to claim 13, wherein in the virtual area there is the non-operable object other than the non-operable object changed from the operable object.

15. The non-transitory storage medium of claim 1, wherein the non-operable object has a plurality of types, wherein the information processing program further configures the at least one processor to, on condition that the non-operable objects of the same type are adjacent to each other by the predetermined number or more, erase the predetermined number or more of the non-operable objects of the same type from the virtual area.

16. An information processing apparatus comprising:
a memory storing a computer-readable program thereon; and
one or more processors, when executing the computer-readable program, configured to perform operations comprising:
moving an operable object in accordance with a coordinate input from a user in a virtual area, and on condition that the operable object is contacted with a non-operable object, restricting movement of the operable object in a direction toward the contacted non-operable object;
on condition that the non-operable object exists between a current position of the operable object and a designated position designated by the coordinate input, determining whether there is a target position to which the operable object can move, wherein the target position is a position between the current position and the designated position, and is a position on a side, with reference to the position of the non-operable object, of the designated position;
generating rendering information for rendering the virtual area, the operable object, and the non-operable object;
on condition that it is determined that there is the target position, moving the operable object to the target position regardless of the restriction; and
on condition that the non-operable object exists between the current position and the designated position, generating the rendering information that has a screen effect different from that when the non-operable object does not exist between the current position and the designated position.

17. An information processing system comprising:
a memory storing a computer-readable program thereon; and
one or more processors, when executing the computer-readable program, configured to perform operations comprising:
  moving an operable object in accordance with a coordinate input from a user in a virtual area, and on condition that the operable object is contacted with a non-operable object, restricting movement of the operable object in a direction toward the contacted non-operable object;
  on condition that the non-operable object exists between a current position of the operable object and a designated position designated by the coordinate input, determining whether there is a target position to which the operable object can move, wherein the target position is a position between the current position and the designated position, and is a position on a side, with reference to the position of the non-operable object, of the designated position; and
  generating rendering information for rendering the virtual area, the operable object, and the non-operable object;
  on condition that it is determined that there is the target position, moving the operable object to the target position regardless of the restriction; and
  on condition that the non-operable object exists between the current position and the designated position, generating the rendering information that has a screen effect different from that when the non-operable object does not exist between the current position and the designated position.

18. An information processing method performed in a computer of an information processing apparatus, the information processing method comprising:
  moving an operable object in accordance with a coordinate input from a user in a virtual area, wherein movement of the operable object is restricted in a direction toward the contacted non-operable object on condition that the operable object is contacted with a non-operable object;
  on condition that the non-operable object exists between a current position of the operable object and a designated position designated by the coordinate input, determining whether there is a target position to which the operable object can move, wherein the target position is a position between the current position and the designated position, and is a position on a side, with reference to the position of the non-operable object, of the designated position;
  generating rendering information for rendering the virtual area, the operable object, and the non-operable object; and
  on condition that the non-operable object exists between the current position and the designated position, generating the rendering information that has a screen effect different from that when the non-operable object does not exist between the current position and the designated position,
  wherein the operable object is moved to the target position regardless of the restriction on condition that it is determined that there is the target position.

* * * * *